(12) United States Patent
Ridel et al.

(10) Patent No.: US 8,879,431 B2
(45) Date of Patent: Nov. 4, 2014

(54) METHOD FOR LOAD BALANCING OF REQUESTS' PROCESSING OF DIAMETER SERVERS

(75) Inventors: Leonid Ridel, Had Hasharon (IL); Valentin Tumarkin, Herzliya (IL)

(73) Assignee: F5 Networks, Inc., Seattle, WA (US)

(*) Notice: Subject to any disclaimer, the term of this patent is extended or adjusted under 35 U.S.C. 154(b) by 138 days.

(21) Appl. No.: 13/473,589

(22) Filed: May 16, 2012

(65) Prior Publication Data

US 2013/0064093 A1 Mar. 14, 2013

Related U.S. Application Data

(60) Provisional application No. 61/457,691, filed on May 16, 2011.

(51) Int. Cl.
- *H04L 12/16* (2006.01)
- *H04L 29/08* (2006.01)
- *H04L 12/803* (2013.01)
- *H04L 12/911* (2013.01)
- *H04L 12/54* (2013.01)
- *H04L 12/819* (2013.01)

(52) U.S. Cl.
CPC ............ *H04L 67/1002* (2013.01); *H04L 67/32* (2013.01); *H04L 47/125* (2013.01); *H04L 67/1012* (2013.01); *H04L 47/741* (2013.01); *H04L 12/5695* (2013.01); *H04L 47/215* (2013.01)
USPC ............................ 370/259; 370/271; 370/270

(58) Field of Classification Search
CPC ............ H04L 67/1002; H04L 12/5695; H04L 47/215; H04L 47/10; H04L 47/21; H04I 67/10
USPC .................................. 370/259, 271, 270, 260
See application file for complete search history.

(56) References Cited

U.S. PATENT DOCUMENTS

| 5,282,201 A | 1/1994 | Frank et al. |
| 5,606,665 A | 2/1997 | Yang et al. |

(Continued)

FOREIGN PATENT DOCUMENTS

| CA | 2080530 A1 | 4/1994 |
| EP | 0605088 A3 | 2/1996 |

(Continued)

OTHER PUBLICATIONS

Baer, T., et al., "The elements of Web services" ADTmag.com, Dec. 1, 2002, pp. 1-6, (http://www.adtmag.com).

(Continued)

*Primary Examiner* — Kwang B Yao
*Assistant Examiner* — Adam Duda
(74) *Attorney, Agent, or Firm* — LeClairRyan, a Professional Corporation

(57) ABSTRACT

A system, computer readable medium and method of load balancing of requests between Diameter-enabled network devices is disclosed. Processing occurs at a signal controller in communication with a first Diameter-enabled network device and a second Diameter-enabled network device, request handling capacity of at least the second Diameter-enabled network device. One or more tokens are allocated for inbound requests from the first Diameter-enabled network device to the second Diameter-enabled network device. The second Diameter-enabled network device is notified of the one or more allocated tokens for handling a corresponding number of requests from the first Diameter-enabled network device. Transmission of the corresponding number of requests from the first Diameter-enabled network device to the second Diameter-enabled network device is coordinated by the signal controller.

24 Claims, 9 Drawing Sheets

(56) References Cited

U.S. PATENT DOCUMENTS

| | | |
|---|---|---|
| 5,623,490 A | 4/1997 | Richter et al. |
| 5,991,302 A | 11/1999 | Berl et al. |
| 5,995,491 A | 11/1999 | Richter et al. |
| 6,026,500 A | 2/2000 | Topff et al. |
| 6,029,175 A | 2/2000 | Chow et al. |
| 6,041,365 A | 3/2000 | Kleinerman |
| 6,047,356 A | 4/2000 | Anderson et al. |
| 6,067,558 A | 5/2000 | Wendt et al. |
| 6,104,706 A | 8/2000 | Richter et al. |
| 6,154,777 A | 11/2000 | Ebrahim |
| 6,157,950 A | 12/2000 | Krishnan |
| 6,259,405 B1 | 7/2001 | Stewart et al. |
| 6,260,070 B1 | 7/2001 | Shah |
| 6,292,832 B1 | 9/2001 | Shah et al. |
| 6,304,913 B1 | 10/2001 | Rune |
| 6,330,574 B1 | 12/2001 | Murashita |
| 6,338,082 B1 | 1/2002 | Schneider |
| 6,353,848 B1 | 3/2002 | Morris |
| 6,363,056 B1 | 3/2002 | Beigi et al. |
| 6,370,527 B1 | 4/2002 | Singhal |
| 6,389,462 B1 | 5/2002 | Cohen et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,513,061 B1 | 1/2003 | Ebata et al. |
| 6,514,085 B2 | 2/2003 | Slattery et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,728,704 B2 | 4/2004 | Mao et al. |
| 6,738,357 B1 | 5/2004 | Richter et al. |
| 6,744,776 B1 | 6/2004 | Kalkunte et al. |
| 6,754,215 B1 | 6/2004 | Arikawa et al. |
| 6,754,699 B2 | 6/2004 | Swildens et al. |
| 6,760,337 B1 | 7/2004 | Snyder, II et al. |
| 6,795,860 B1 | 9/2004 | Shah |
| 6,865,593 B1 | 3/2005 | Reshef et al. |
| 6,868,447 B1 | 3/2005 | Slaughter et al. |
| 6,871,221 B1 | 3/2005 | Styles |
| 6,880,017 B1 | 4/2005 | Marce et al. |
| 6,883,137 B1 | 4/2005 | Girardot et al. |
| 6,914,881 B1 | 7/2005 | Mansfield et al. |
| 6,928,518 B2 | 8/2005 | Talagala |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,996 B2 | 9/2006 | Kronenberg |
| 7,133,863 B2 | 11/2006 | Teng et al. |
| 7,191,163 B2 | 3/2007 | Herrera et al. |
| 7,228,359 B1 | 6/2007 | Monteiro |
| 7,236,491 B2 | 6/2007 | Tsao et al. |
| 7,240,100 B1 | 7/2007 | Wein et al. |
| 7,292,541 B1 | 11/2007 | C S |
| 7,296,263 B1 | 11/2007 | Jacob |
| 7,308,475 B1 | 12/2007 | Pruitt et al. |
| 7,324,533 B1 | 1/2008 | DeLiberato et al. |
| 7,340,571 B2 | 3/2008 | Saze |
| 7,373,438 B1 | 5/2008 | DeBergalis et al. |
| 7,409,440 B1 | 8/2008 | Jacob |
| 7,577,723 B2 | 8/2009 | Matsuda et al. |
| 7,684,423 B2 | 3/2010 | Tripathi et al. |
| 7,698,458 B1 | 4/2010 | Liu et al. |
| 7,861,085 B1 | 12/2010 | Case et al. |
| 7,903,554 B1 | 3/2011 | Manur et al. |
| 7,908,245 B2 | 3/2011 | Nakano et al. |
| 7,984,500 B1 | 7/2011 | Khanna et al. |
| 8,064,342 B2 | 11/2011 | Badger |
| 8,069,225 B2 | 11/2011 | McCanne et al. |
| 8,155,128 B2 * | 4/2012 | Balyan et al. .................. 370/400 |
| 8,171,124 B2 | 5/2012 | Kondamuru |
| 2001/0007560 A1 | 7/2001 | Masuda et al. |
| 2002/0012352 A1 | 1/2002 | Hansson et al. |
| 2002/0038360 A1 | 3/2002 | Andrews et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0103823 A1 | 8/2002 | Jackson et al. |
| 2002/0143819 A1 | 10/2002 | Han et al. |
| 2002/0162118 A1 | 10/2002 | Levy et al. |
| 2002/0174216 A1 | 11/2002 | Shorey et al. |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0034905 A1 | 2/2003 | Anton et al. |
| 2003/0051045 A1 | 3/2003 | Connor |
| 2003/0055723 A1 | 3/2003 | English |
| 2003/0074301 A1 | 4/2003 | Solomon |
| 2003/0105846 A1 | 6/2003 | Zhao et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0156586 A1 | 8/2003 | Lee et al. |
| 2003/0179755 A1 | 9/2003 | Fraser |
| 2003/0191812 A1 | 10/2003 | Agarwalla et al. |
| 2003/0195813 A1 | 10/2003 | Pallister et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0167967 A1 | 8/2004 | Bastian et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 * | 8/2005 | Legault et al. ............. 370/235.1 |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2006/0031374 A1 | 2/2006 | Lu et al. |
| 2006/0031778 A1 | 2/2006 | Goodwin et al. |

(56) References Cited

U.S. PATENT DOCUMENTS

| | | | |
|---|---|---|---|
| 2006/0045089 A1 | 3/2006 | Bacher et al. | |
| 2006/0045096 A1 | 3/2006 | Farmer et al. | |
| 2006/0047785 A1 | 3/2006 | Wang et al. | |
| 2006/0100752 A1 | 5/2006 | Kim et al. | |
| 2006/0112367 A1 | 5/2006 | Harris | |
| 2006/0123210 A1 | 6/2006 | Pritchett et al. | |
| 2006/0140193 A1 | 6/2006 | Kakani et al. | |
| 2006/0153201 A1 | 7/2006 | Hepper et al. | |
| 2006/0235998 A1 | 10/2006 | Stecher et al. | |
| 2006/0259320 A1 | 11/2006 | LaSalle et al. | |
| 2006/0268692 A1 | 11/2006 | Wright et al. | |
| 2006/0270341 A1 | 11/2006 | Kim et al. | |
| 2006/0282442 A1 | 12/2006 | Lennon et al. | |
| 2007/0005807 A1 | 1/2007 | Wong | |
| 2007/0016613 A1 | 1/2007 | Foresti et al. | |
| 2007/0038994 A1 | 2/2007 | Davis et al. | |
| 2007/0112775 A1 | 5/2007 | Ackerman | |
| 2007/0124415 A1 | 5/2007 | Lev-Ran et al. | |
| 2007/0124502 A1 | 5/2007 | Li | |
| 2007/0130255 A1 | 6/2007 | Wolovitz et al. | |
| 2007/0162891 A1 | 7/2007 | Burner et al. | |
| 2007/0168320 A1 | 7/2007 | Borthakur et al. | |
| 2007/0233826 A1 | 10/2007 | Tindal et al. | |
| 2008/0004022 A1 | 1/2008 | Johannesson et al. | |
| 2008/0010372 A1 | 1/2008 | Khedouri et al. | |
| 2008/0022059 A1 | 1/2008 | Zimmerer et al. | |
| 2008/0208917 A1 | 8/2008 | Smoot et al. | |
| 2008/0263401 A1 | 10/2008 | Stenzel | |
| 2008/0270578 A1 | 10/2008 | Zhang et al. | |
| 2008/0281908 A1 | 11/2008 | McCanne et al. | |
| 2009/0080440 A1* | 3/2009 | Balyan et al. | 370/400 |
| 2009/0094311 A1 | 4/2009 | Awadallah et al. | |
| 2009/0106413 A1 | 4/2009 | Salo et al. | |
| 2009/0125955 A1 | 5/2009 | DeLorme | |
| 2009/0138314 A1 | 5/2009 | Bruce | |
| 2009/0161542 A1 | 6/2009 | Ho | |
| 2009/0187915 A1 | 7/2009 | Chew et al. | |
| 2009/0217163 A1 | 8/2009 | Jaroker | |
| 2009/0217386 A1 | 8/2009 | Schneider | |
| 2009/0265396 A1 | 10/2009 | Ram et al. | |
| 2009/0265467 A1* | 10/2009 | Peles | 709/226 |
| 2009/0292957 A1 | 11/2009 | Bower et al. | |
| 2009/0300161 A1 | 12/2009 | Pruitt et al. | |
| 2009/0316708 A1 | 12/2009 | Yahyaoui et al. | |
| 2009/0319600 A1 | 12/2009 | Sedan et al. | |
| 2010/0042743 A1 | 2/2010 | Jeon et al. | |
| 2010/0061232 A1 | 3/2010 | Zhou et al. | |
| 2010/0064001 A1 | 3/2010 | Daily | |
| 2010/0070476 A1 | 3/2010 | O'Keefe et al. | |
| 2010/0093318 A1* | 4/2010 | Zhu et al. | 455/414.1 |
| 2010/0179984 A1 | 7/2010 | Sebastian | |
| 2010/0228819 A1 | 9/2010 | Wei | |
| 2010/0242092 A1 | 9/2010 | Harris et al. | |
| 2010/0250497 A1 | 9/2010 | Redlich et al. | |
| 2010/0274772 A1 | 10/2010 | Samuels | |
| 2010/0306169 A1 | 12/2010 | Pishevar et al. | |
| 2011/0055921 A1 | 3/2011 | Narayanaswamy et al. | |
| 2011/0066736 A1 | 3/2011 | Mitchell et al. | |
| 2011/0072321 A1 | 3/2011 | Dhuse | |
| 2011/0116377 A1* | 5/2011 | Batz et al. | 370/235 |
| 2012/0117028 A1 | 5/2012 | Gold et al. | |
| 2012/0150805 A1 | 6/2012 | Pafumi et al. | |

FOREIGN PATENT DOCUMENTS

| | | |
|---|---|---|
| EP | 1081918 A2 | 3/2001 |
| JP | 06-205006 | 7/1994 |
| JP | 8021924 B | 3/1996 |
| JP | 2000183935 | 6/2000 |
| WO | 00/58870 A2 | 10/2000 |
| WO | 02/39696 A2 | 5/2002 |
| WO | 2006/091040 A1 | 8/2006 |

OTHER PUBLICATIONS

Blue Coat, "Technology Primer: CIFS Protocol Optimization," Blue Coat Systems Inc., 2007, pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5produces/3dns/relatedMaterials/UsingF5.html).

F5 Networks Inc., "Case Information Log for 'Issues with BoNY upgrade to 4.3'", as early as Feb. 2008.

F5 Networks Inc., "F5 WANJet CIFS Acceleration", White Paper, F5 Networks Inc., Mar. 2006, pp. 1-5, Seattle, Washington.

Fajardo V., "Open Diameter Software Architecture," Jun. 25, 2004, pp. 1-6, Version 1.0.7.

Gupta et al., "Algorithms for Packet Classification", Computer Systems Laboratory, Stanford University, CA, Mar./Apr. 2001, pp. 1-29.

Heinz III. G., "Priorities in Stream Transmission Control Protocol (SCTP) Multistreaming", Thesis submitted to the Faculty of the University of Delaware, Spring 2003, pp. 1-35.

Ilvesmaki, M., et al., "On the capabilities of application level traffic measurements to differentiate and classify Internet traffic", Presented in SPIE's International Symposium ITcom, Aug. 19-21, 2001, pp. 1-11, Denver, Colorado.

Internet Protocol,"DARPA Internet Program Protocol Specification", (RFC:791), Information Sciences Institute, University of Southern California, Sep. 1981, pp. 1-49.

Kawamoto, D., "Amazon files for Web services patent", CNET News.com, Jul. 28, 2005, pp. 1-2, (http://news.com).

LaMonica M., "Infravio spiffs up Web services registry idea", CNET News.com, May 11, 2004, pp. 1-2, (http://www.news.com).

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling Algorithms for Message Transmission Over a Satellite Broadcast System," MIT Lincoln Laboratory Advanced Network Group, Nov. 1997, pp. 1-7.

Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

(56) References Cited

OTHER PUBLICATIONS

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Rosen E., et al., "MPLS Label Stack Encoding", (RFC:3032) Network Working Group, Jan. 2001, pp. 1-22, (http://www.ietf.org/rfc/rfc3032.txt).

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.com, Oct. 22, 2003, (http://www.adtmag.com).

Shohoud, Y., "Building XML Web Services with VB.NET and VB 6", Addison Wesley, 2002, pp. 1-14.

Sommers F., "Whats New in UDDI 3.0—Part 1", Web Services Papers, Jan. 27, 2003, pp. 1-4, (http://www.webservices.org/index.php/article/articleprint/871/-1/24/).

Sommers F., "Whats New in UDDI 3.0—Part 2", Web Services Papers, Mar. 2, 2003, pp. 1-8, (http://www.web.archive.org/web/20040620131006/).

Sommers F., "Whats New in UDDI 3.0—Part 3", Web Services Papers, Sep. 2, 2003, pp. 1-4, (http://www.webservices.org/index.php/article/articleprint/894/-1/24/).

Sleeper B., "The Evolution of UDDI", UDDI.org White Paper, The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

"UDDI Overview", Sep. 6, 2000, pp. 1-21, uddi.org, (http://www.uddi.org/).

"UDDI Version 3.0.1", UDDI Spec Technical Committee Specification, Oct. 14, 2003, pp. 1-383, uddi.org, (http://www.uddi.org/).

"UDDI Technical White Paper," Sep. 6, 2000, pp. 1-12, uddi-org, (http://www.uddi.org/).

Wang B., "Priority and realtime data transfer over the best-effort Internet", Dissertation Abstract, 2005, ScholarWorks@UMASS.

Wikipedia, "Diameter (protocol)", pp. 1-11, last accessed Oct. 27, 2010, (http://en.wikipedia.org/wiki/Diameter_(protocol)).

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

Raghavan B., et al., "Cloud Control with Distributed Rate Limiting", SIGCOMM'07, Aug. 27-31, 2007, pp. 1-11, Department of Computer Science and Engineering, University of California, San Diego, CA.

Snoeren A., et al., "Managing Cloud Resources:Distributed Rate Limited", Building and Programming the Cloud Workshop, Jan. 13, 2010, pp. 1-38, UCSDCSE Computer Science and Engineering.

International Search Report for International Patent Application No. PCT/US2012/038228 (Oct. 19, 2012).

Traffix Systems, "Diameter Edge Agent (DEA)", Jul. 2, 2012, pp. 2-5, (http://www traffixsystems comsolutionsedge-routing-DEA).

Traffix Systems, "Signaling Delivery Controller (SDC)", Jul. 1, 2012, pp. 2-5, (http://www traffixsystems comsolutionsSDC).

Traffix Systems, "Diameter Routing Agent (DRA)", Jul. 2, 2012, pp. 2-5, (http://www traffixsystems comsolutionsdiameter-routing-agent-DRA).

U.S. Appl. No. 12/622,885, filed Nov. 20, 2009, entitled "Methods and System for MAPI Data Mormalization Between a Client and a Server," Inventor, S. Majee.

U.S. Appl. No. 13/307,923, filed Nov. 20, 2011, entitled "Methods for Content Inlining and Devices Thereof," Inventor, G. Lowell, Jr.

U.S. Appl. No. 13/771,538, filed Feb. 20, 2013, entitled "Methods for Improving Flow Cache Bandwidth Utilization and Devices Thereof," Inventors, T. Michaels et al.

U.S. Appl. No. 14/032,329, filed Sep. 20, 2013, entitled "System and Method for Smart Load Balancing," Inventors, R. Masters et al.

U.S. Appl. No. 14/038,433, filed Sep. 26, 2013, entitled "System and Method for Scaling a TCP Stack Across Multiple Cores via Advertised Window Partitioning," Inventor, S. Amdahl.

U.S. Appl. No. 14/081,700, filed Nov. 15, 2013 entitled, "Methods to Ensure Load Balancing of NFS Requests to NAS Cluster and Devices Thereof," Inventor, B. McCann.

U.S. Appl. No. 14/194,268, filed Feb. 28, 2014, entitled "National Traffic Steering Device for a Better Control of a Specific Wireless/LTE Network," Inventors, L. Ridel et al.

U.S. Appl. No. 14/139,228, filed Dec. 23, 2013, entitled "Methods for Improving Network Traffic Management Device Performance and Devices Thereof," Inventors, S. Lewites et al.

U.S. Appl. No. 14/144,137, filed Dec. 30, 2013, entitled "System and Method for Utiliziing a Data Reducing Module for Dictionary Compression of Encoded Data," Inventor, S. Amdahl.

U.S. Appl. No. 14/042,237, filed Sep. 30, 2013, entitled "System and Method for Utilizing a Data Reducing Module for Dictionary Compression of Encoded Data," Inventor, S. Amdahl.

* cited by examiner

METHOD FOR LOAD BALANCING OF REQUESTS' PROCESSING OF DIAMETER SERVERS

RELATED APPLICATION

The present application claims the benefit of priority based on U.S. Provisional Patent Application Ser. No. 61/457,691, filed on May 16, 2011, in the name of inventors Leonid Ridel & Valentin Tumarkin, entitled "Diameter Based Method For Multi Diameter Agent Cross Network Updates", which is hereby incorporated by reference in its entirety.

FIELD

The present disclosure generally relates to systems and methods for load balancing of requests processing between two or more Diameter network devices via a signal controller.

BACKGROUND

Mobile network operators are empowering their networks with Internet Protocol (IP) Fourth generation (4G) technologies such as IP Multimedia Subsystem (IMS), Long Term Evolution (LTE) and the like. These technologies require systems to communicate with each other using a signaling protocol that can support millions of subscribers accessing the Internet via their mobile devices.

One particular signaling protocol using in the mobile telecommunication industry is the Diameter protocol, which enables operators the support of 4G services. The Diameter protocol is a flexible signaling protocol that can be dynamically customized and adjusted to the specified needs of the system, such as the addition of Attribute Value Pairs (AVP's) or types of Diameter server messages. The Diameter protocol is also capable of managing a constant flow of core network signaling in a complex environment with multiple network elements. Additionally, considering that the network operators mainly manage data traffic, voice traffic has become secondary in priority. Such data traffic may include World Wide Web (www), video, Short Messaging Services (SMS), Multimedia Messaging Services (MMS), video chat, video/audio streaming and Voice over IP (VoIP).

Mobile network operators may require: (i) configuration of Diameter protocol solutions such as gateways to connect new elements in the mobile network to old elements in the mobile network; (ii) scalability of load balancers for allowing the network to grow smoothly; and (iii) ensuring that routers route messages from each subscriber to go to the correct destination.

However, in existing systems, each of these network entities operates independently with no information about: (i) the activity rate of other Diameter servers, either in its own network or in an interconnected network; (ii) internal configuration data; (iii) routing considerations of the Diameter servers; (iv) states of connected Diameter clients or servers; and (v) existing sessions' status.

Current Diameter agents in mobile network deployments lack a number of network related capabilities. Such capabilities include, but are not limited to: available means to share configuration information of Diameter agents across the network such that unified network configuration and optimized delivery can be enabled; means to share information about the state of particular Diameter clients and servers to enable network wide optimized delivery; means of sharing capacity capabilities, and current capacity utilization of Diameter network devices; means to share information between Diameter agents; and means for utilizing network wide reliability mechanisms and security mechanisms.

SUMMARY

In an aspect, a method of load balancing of requests between Diameter-enabled network devices is disclosed. The method comprises processing, at a signal controller in communication with a first Diameter-enabled network device and a second Diameter-enabled network device, request handling capacity of at least the second Diameter-enabled network device. The method comprises allocating, at the signal controller, one or more tokens for inbound requests from the first Diameter-enabled network device to the second Diameter-enabled network device. The method comprises notifying the second Diameter-enabled network device of the one or more allocated tokens for handling a corresponding number of requests from the first Diameter-enabled network device. The method comprises coordinating, at the signal controller, transmission of the corresponding number of requests from the first Diameter-enabled network device to the second Diameter-enabled network device via the signal controller.

In an aspect, a non-transitory computer readable medium having stored thereon instructions for load balancing of requests between Diameter-enabled network devices, comprising machine executable code which when executed by at least one processor in a signal controller in communication with a first Diameter-enabled network device and a second Diameter-enabled network device is disclosed. The processor is configured to determine request handling capacity of at least the second Diameter-enabled network device. The processor is configured to allocate one or more tokens for inbound requests from the first Diameter-enabled network device to the second Diameter-enabled network device. The processor is configured to notify the second Diameter-enabled network device of the one or more allocated tokens for handling a corresponding number of requests from the first Diameter-enabled network device. The processor is configured to coordinate transmission of the corresponding number of requests from the first Diameter-enabled network device to the second Diameter-enabled network device.

In an aspect, a signal controller in communication with a first Diameter-enabled network device and a second Diameter-enabled network device is disclosed. The signal controller comprises a network interface configured to be capable of receiving and transmitting network data packets over one or more networks. The signal controller comprises a memory configured to store executable programming instructions. The signal controller comprises a processor configured executing the stored programming instructions, which when executed result in actions being performed that include processing request handling capacity of at least the second Diameter-enabled network device; allocating one or more tokens for inbound requests from the first Diameter-enabled network device to the second Diameter-enabled network device; notifying the second Diameter-enabled network device of the one or more allocated tokens for handling a corresponding number of requests from the first Diameter-enabled network device; and coordinating transmission of the corresponding number of requests from the first Diameter-enabled network device to the second Diameter-enabled network device.

In one or more of the above aspects, token allocation is prioritized between the first and second Diameter-enabled network device. In one or more of the above aspects, the request handling capacity further comprises current and projected capacity of the second Diameter-enabled network device. In one or more of the above aspects, the signal controller allocates the one or more tokens at a refill rate based on current and projected capacity of the second Diameter-enabled network device. In one or more of the above aspects, the allocated tokens are available for a predetermined period of time. In one or more of the above aspects, a notification is received from the second Diameter-enabled network device that has detected an overload condition, the notification indicating to allocate zero tokens to the first Diameter-enabled network device. Accordingly, no further requests from the first Diameter-enabled network device to the second Diameter-enabled network device via the signal controller.

DETAILED DESCRIPTION

In general, the present disclosure is directed to methods and systems for load balancing of request processing among network device utilizing the Diameter protocol. The method may share configuration and Diameter protocol traffic updates to optimize network wide Diameter protocol based message routing while considering reliability constraints such as failover of routers. The present system and method optimizes Diameter based traffic inside service provider's networks and across different service provider's networks.

The present disclosure may extend Diameter basic protocol and add new commands and Diameter AVP's to the Diameter signaling between different Diameter agents, which allows information to be shared between different Diameter agents. This information that may be stored in the Diameter AVP's may be used for sharing information between multiple Diameter agents, for unified, optimized and synchronized Diameter protocol signaling handling between multiple Diameter agents.

According to some aspects of the present disclosure, a token-based mechanism is used as means for a Diameter network device to notify other connected network devices about its current capacity capabilities and the amount of resources that may be allocated to process its requests. The token-based mechanism may be utilized for balancing the Outbound Diameter network device traffic according to the capacity of the Remote Diameter network device. Capacity of Diameter network devices may fluctuate based on current load, type of requests, amount of cached information, and performance of connected Diameter network devices.

Figure 1:
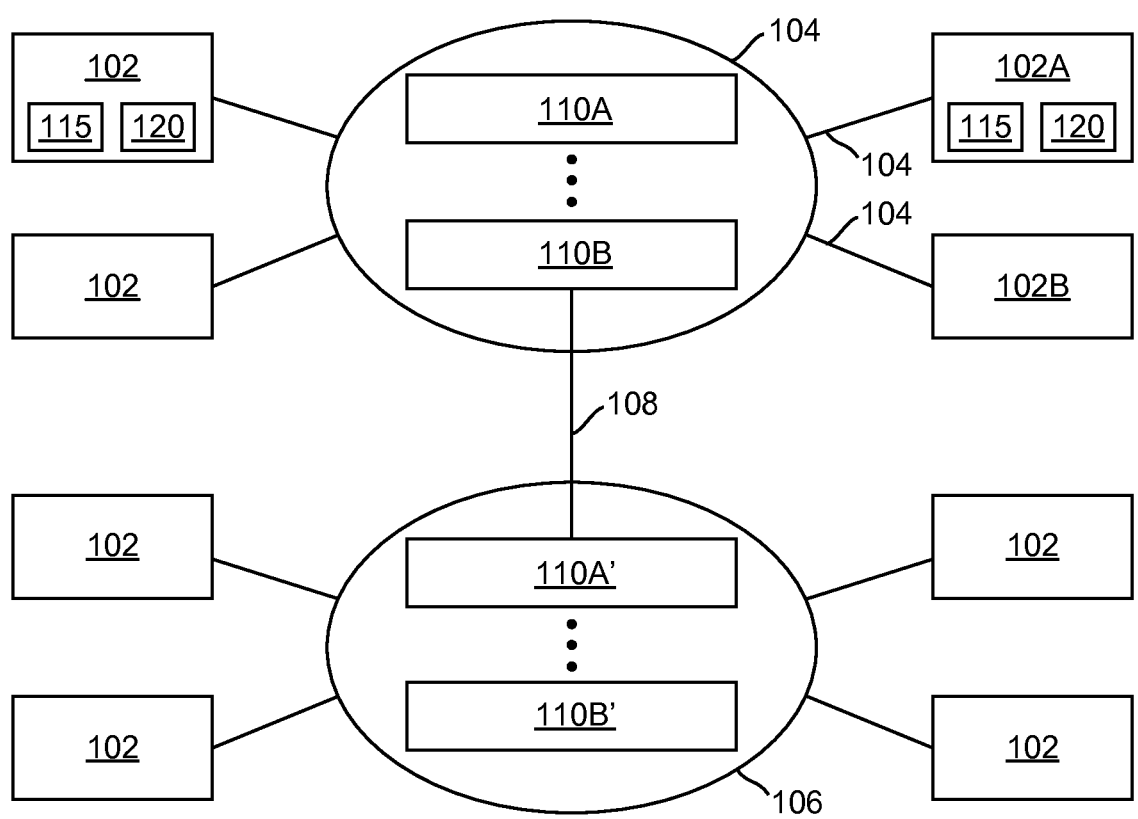
FIG. 1 illustrates a general computing environment involving signal controllers in communication with Diameter enabled network devices over a network in accordance with an aspect of the present disclosure.

FIG. 1 illustrates a general computing environment involving signal controllers in communication with Diameter enabled network devices over a network in accordance with an aspect of the present disclosure. As shown in FIG. 1, the environment 100 includes one or more signal controller data centers 104, 106 in which each signal controller center 104, 106 includes one or more signal controllers 110A, 110B, 110A', 110B' (referred to generally as 110). Additionally, one or more signal controllers 110 communicate with one or more Diameter enabled network devices 102 over a wide area network, mobile network, local area network and the like. The controller centers 104, 106 communicate and synchronize data with one another to allow effective and efficient communications with one or more Diameter enabled network devices 102 in normal use or in the event of a failover of one or more signal controllers 110.

As shown in FIG. 1, one or more Diameter network devices may have an Inbound Traffic Token Pool 120 and an Outbound Traffic Token Pool 115, wherein each Token Pool contains one or more tokens that are used for authentication procedures. In an aspect, every request or response can be transmitted between Diameter network devices after a token is granted for that request or response. Thus, tokens in the Inbound Traffic Token Pool 120 are allocated for processing inbound requests from another Diameter network device 102. As will be discussed in more detail below, the maximum size and/or refill rate of the Inbound Token pool 120 may be configured to correspond to the current and/or projected capacity of the Diameter network device 110.

In an aspect, the Diameter network device 110 includes an Outbound Traffic Token pool 115 which contains tokens that represent the capacity of the Remote Diameter network device 102 to process outbound requests from Diameter network device 110. As will be discussed in more detail below, the size of the Outbound Traffic Token pool 115 may be configured to correspond to the current and/or projected capacity of the Remote Diameter network device 102, or another remote Diameter network device.

According to some aspects of the present disclosure, one or more methods may be used to add tokens to the token pools 115, 120 in the Diameter network device 110. In one aspect, there may be a fixed rate allocation in which new tokens are added at a specified rate to the token pool (e.g. adding X token(s) per second). In another aspect, either/both token pools 115, 120 may be refilled with tokens based on the number of tokens granted by Diameter network devices 110, 102. In one example, as the Inbound Traffic token pool 115 grants most of the tokens, it may be refilled using tokens that were granted by Outbound Traffic token pool in the Diameter network device 102.

In an aspect, tokens may be added to token pools 115, 120 by utilizing an allocation management algorithm. In another aspect, tokens may be added to the token pools 115, 120 of the Diameter network device 110 based on the performance of the Diameter network device 102. In this aspect, the performance of the Diameter network device 102 is measured by the remote Diameter network device 102 and communicated to the Diameter network device 110 over connection 104. In an aspect, such measurements may be associated with the number of outbound requests received at Diameter network device 102, although other appropriate measurements are contemplated.

In an aspect, the allocation of one or more tokens by Diameter network device 110 may be performed on a periodic basis as set by a network administrator (e.g. every second); upon request by another remote Diameter network device 102; and/or upon a change of state of the Diameter network device 110 allocating the tokens (e.g. overload of the token pool).

In an aspect, the Diameter network device 110, upon allocating the one or more tokens, is configured to communicate with or otherwise notify one or more other remote Diameter network devices 102 as to the amount of tokens that the Diameter network device 110 has just allocated. The notification may be carried out using the existing connection 104 between Diameter network devices 110, 102. These communications can be encoded as a Diameter-based message or appended to an existing Diameter Protocol message, such as Diameter Watchdog Request (DWR)/Diameter Watchdog Answer (DWA), and the like.

In an aspect, the notification may include a time period specification generated by the Diameter network device 110 which limits the duration for which the allocated token(s) is valid. In an aspect, it is contemplated that the Diameter network device 110 may specify in the notification, or in a separate message, that the allocation is valid only for a specific type of request. Such types of requests include, but are not limited to, requests to a specific Diameter Realm, new allocations overriding any existing allocations, and the like.

As shown in FIG. 1, one or more signal controllers 110 include a Diameter Routing Agent (DRA) 210, which allows the signal controller 110 to perform as a relay between two or more Diameter network devices 102. In an aspect, the signal controller 110 may be positioned at a gateway to a local area network (LAN) 104 such that the signal controller 110 receives Diameter-based requests from Diameter network devices 102 external to the LAN, as shown in FIG. 1. The signal controller 110 forwards the requests to one or more Diameter network devices 102A, 102B via the LAN 104. The signal controller 110 may control and regulate incoming traffic based on available and allocated tokens of the one or more internal Diameter network devices 102A, 102B. In an aspect, as will be discussed in more detail below, the signal controller 110 may perform the allocation of tokens on behalf of the Diameter network device 102A, 102B.

Figure 2A:
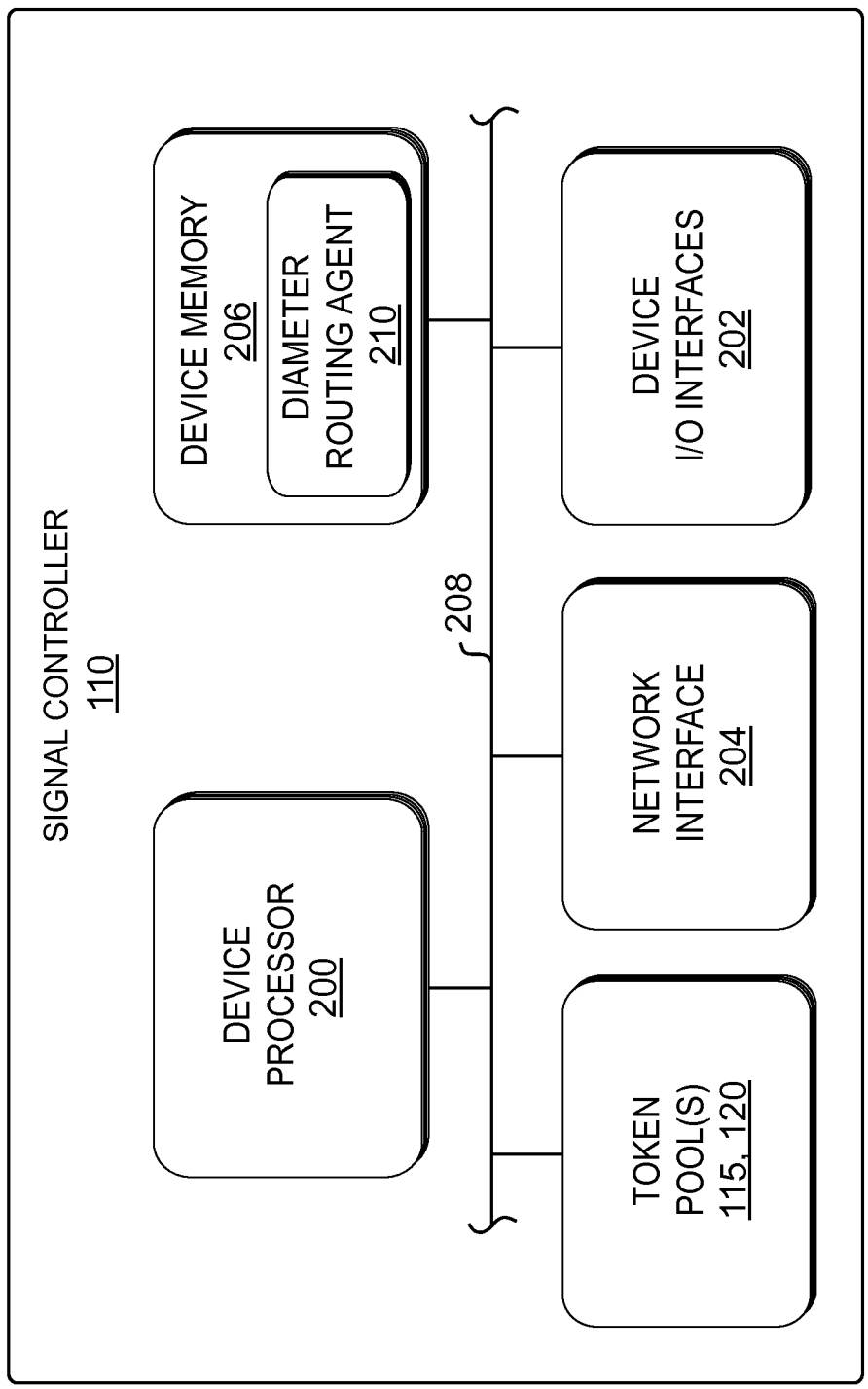
FIG. 2A is a block diagram of an example signal controller in accordance with an aspect of the present disclosure.

FIG. 2A is a block diagram of an example signal controller in accordance with an aspect of the present disclosure. As shown in FIG. 2A, the example signal controller includes one or more device processors 200, one or more device I/O interfaces 202, one or more network interfaces 204, one or more device memories 206, and one or more token pools 115, 120 all of which are coupled together via bus 208. It should be noted that the device 110 could include other types and numbers of components. As shown in FIG. 2A, the signal controller includes a Diameter Routing Agent (DRA) 210 which is stored in the memory 206 or in another memory remote from the signaling delivery controller.

Device processor 200 comprises one or more microprocessors configured to execute computer/machine readable and executable instructions stored in device memory 206. Such instructions implement network traffic management related functions, such as load balancing and routing, as well as general operation of the signal controller. In addition, the processor 200, upon executing the software instructions in the memory 206, will perform one or more portions of the processes described below in accordance with the present disclosure.

Device I/O interfaces 202 comprise one or more user input and output device interface mechanisms. The interface may include a computer keyboard, mouse, touch screen, display device, and the corresponding physical ports and underlying supporting hardware and software to enable the signal controller to communicate with the outside environment. Such communications may include accepting user data input and to provide user output, although other types and numbers of user input and output devices may be used. Additionally or alternatively, as will be described in connection with network interface 204 below, the signal controller may communicate with the outside environment for certain types of operations (e.g., configuration) via a network management port.

Network interface 204 comprises one or more mechanisms that enable the signal controller to engage in network communications using one or more network protocols (e.g. HTTP) over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the signal controller includes more than one device processor 200 (or a processor 200 has more than one core), wherein each processor 200 (and/or core) may use the same single network interface 204 or a plurality of network interfaces 204. Further, the network interface 204 may include one or more physical ports, such as Ethernet ports, to couple the signal controller with other network devices, such as Diameter servers 102. Moreover, the interface 204 may include certain physical ports dedicated to receiving and/or transmitting certain types of network data, such as device management related data for configuring the signal controller.

Bus 208 may comprise one or more internal device component communication buses, links, bridges and supporting components, such as bus controllers and/or arbiters. The bus enable the various components of the signal controller, such as the processor 200, device I/O interfaces 202, network interface 204, DRA 210 and device memory 206, to communicate with one another. However, it is contemplated that the bus may enable one or more components of the Diameter network device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the signal controller.

Device memory 206 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information.

Such desired information includes data and/or computer/machine-executable instructions and which can be accessed by one or more processors 200 of the signal controller.

Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of signal controller to manage network traffic as well as allocate tokens as described in more detail herein.

As shown in FIG. 2A, the signal controller 110 includes a Diameter Routing Agent (DRA) which comprises a non-transitory computer readable medium encoded with computer executable instructions that allow the signal controller to perform the functions described in the present disclosure. In an aspect, the DRA is configured to allow the signal controller 110 to determine a number of tokens to allocate to one or more remote Diameter network devices 102. In an aspect, the DRA is configured to allocate tokens for inbound and/or outbound traffic associated with a Diameter network device 102 based on information representative of current and projected capacity of that device or another Diameter network device. In an aspect, the number of tokens to be allocated is based on the classification of the Diameter network device. In an aspect, the DRA is configured to allow the signal controller 110 to acknowledge the allocation of tokens by another Diameter network device 102. In an aspect, the DRA is configured to allow the signal controller 110 to coordinate the transmissions of requests between Diameter network devices based on the number of allocated tokens.

Figure 2B:
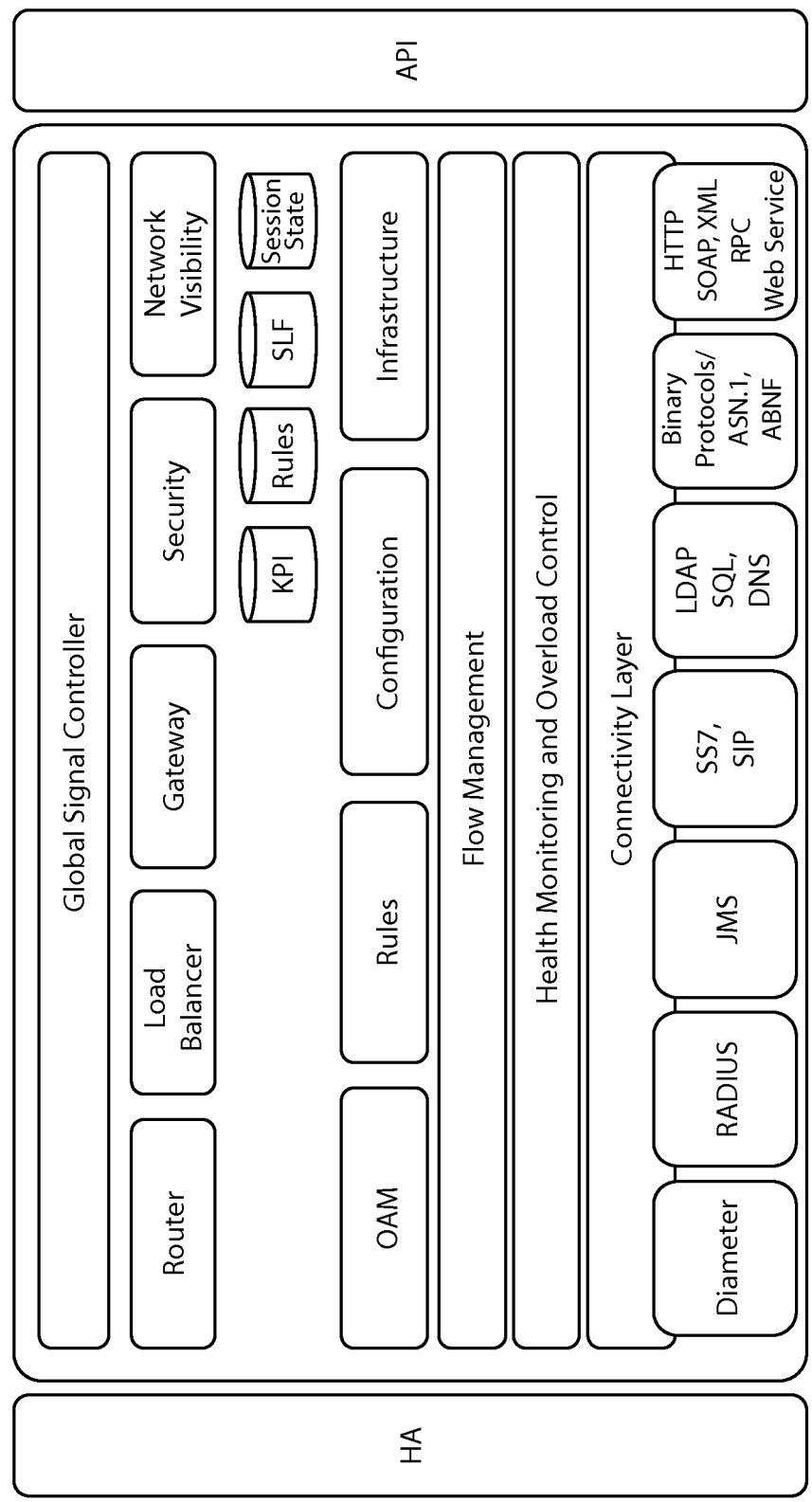
FIG. 2B illustrates a block diagram of an exemplary signal controller in accordance with an aspect of the present disclosure.

FIG. 2B illustrates a block diagram of an exemplary signal controller in accordance with an aspect of the present disclosure. As shown in FIG. 2B, the signal controller 110 may include High Availability module 212 to allow recovery in the case of a failover at a data center 104, 106 (FIG. 1). Additionally, the signal controller 110 may have network capabilities such as routing, load balancing, gateway functions, security and network visibility solutions. The signal controller 110 has OAM functionality as well as rules/policy based enforcement, configuration handling as well as infrastructure utilization. Although the signal controller 110 (as well as the network devices 102) are described herein in the context of the Diameter protocol, other protocols are contemplated for use including, but not limited to, RADIUS, JMS, SS7, SIP, LDAP, SQL, DNS, ASN.1, ABNF, HTTP, SOAP, XML, RPC, Web services and Binary protocols. The signal controller 110 may include an API for interface functionality with other software and/or hardware components. The signal controller 110 handles flow management as well as health monitoring of itself as well as other signal controllers (such as in a data center 104, 106) and/or network devices 102, 102'. In one aspect, the signal controller 110 is able to estimate the capacity of one or more network devices 102, 102' to handle requests from other peer network devices.

The DRA provides a Diameter protocol based interface that is used to connect different Diameter agents, such as Diameter network devices (also referred to as "agents") 102 and signal controllers 110 and enable them to share information. The information shared between the Diameter agents will be used for network optimization, configuration updates and security enforcement.

Information that is distributed includes, but is not limited to, configuration information; Diameter Routing Tables; Load-Balancing configuration (e.g.: Load-Balancing Peer selection algorithm); Diameter Dictionary (e.g. Diameter Message and Attribute Code to Name mapping); Maximum load supported by the particular Diameter network device (e.g. maximum supported for messages per second, established sessions, subscribers, Diameter connections); Access Lists; Policy and management configuration related information and the like. State information may also be shared such as Peer (e.g. clients, signal controllers and servers) link states; Current peer load metrics and KPIs (e.g. counters for messages per second, established sessions, subscribers) and the like.

The above information can be provided Directly by the Diameter Agents; by the Diameter Agents aggregating information for its corresponding Diameter Agents, in a high-availability cluster; and/or by a "front-end" Diameter Agent, on behalf on other peer or group of peers. Considering that the Diameter protocol is a flexible signaling protocol and can be dynamically customized and adjusted by the user, Vendor Specific Attribute Value Pairs (AVP's) or Diameter message types can be utilized by the system. Accordingly, the system extends the Diameter base protocol and adds new Commands and Diameter AVP's to the Diameter signaling between different Diameter agents, which will include information that will be shared between different Diameter agents. This information stored in the Diameter AVP's will be used for sharing information between multiple Diameter agents, for unified, optimized and synchronized Diameter protocol signaling handling between multiple Diameter agents.

Figure 3:
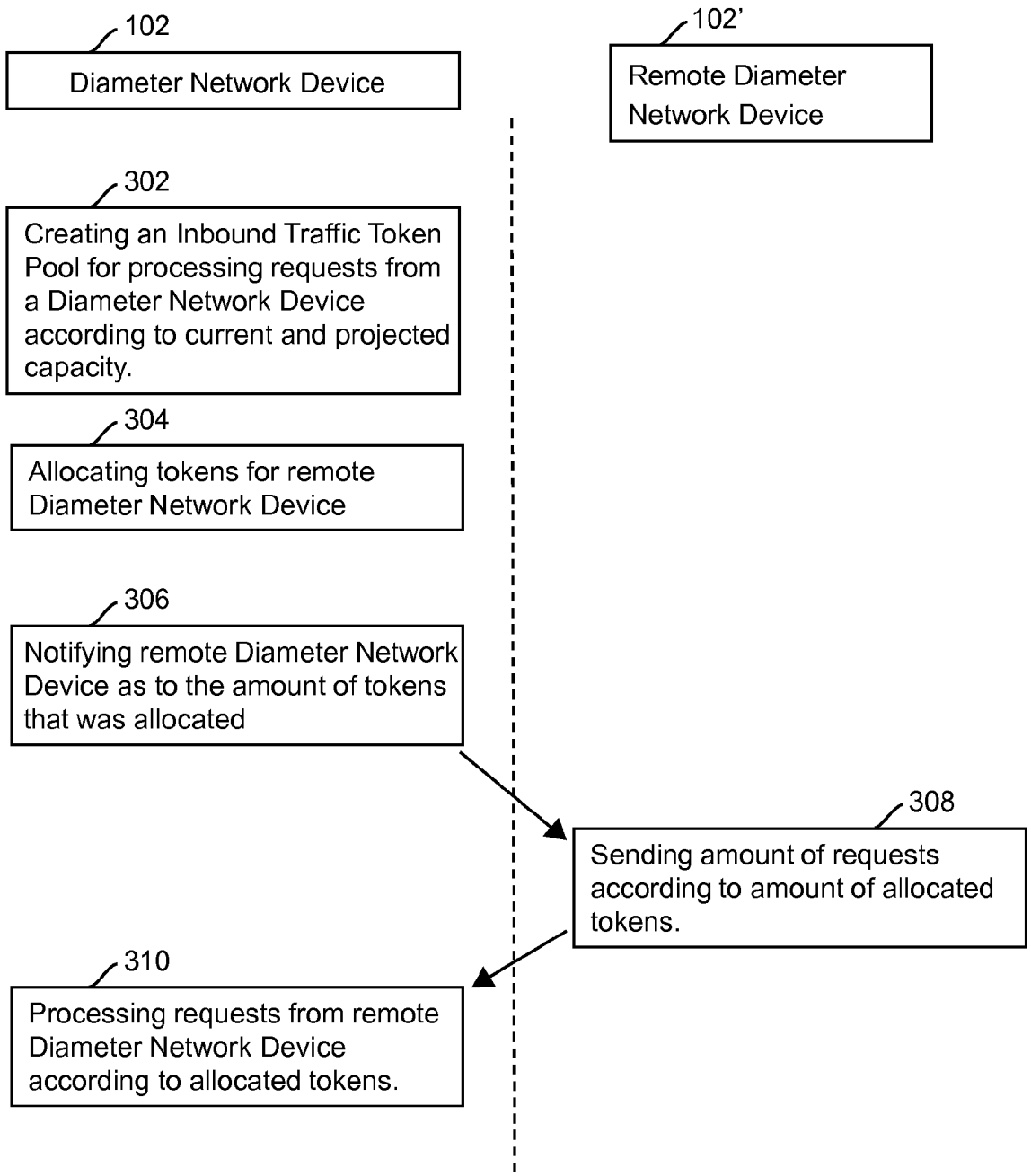
FIG. 3 illustrates a flowchart representative of the method of creating and using token pools between two Diameter-enabled network devices in accordance with an aspect of the present disclosure.

FIG. 3 illustrates a flowchart representative of the method of creating and using token pools between two Diameter-enabled network devices in accordance with an aspect of the present disclosure. In particular, a first Diameter network device 102 may create an Inbound Traffic Token Pool for processing requests from one or more other Diameter network devices 102' in accordance with a current and/or projected capacity of the first Diameter network device 102 (stage 302). Optionally, an Outbound Traffic Token Pool may be created with capacity of at least one remote Diameter network device 102' that may process outbound requests from Diameter network device 102.

In an aspect, the Diameter network device 102 may thereafter allocate tokens for the remote Diameter network device 102' (stage 304). Following, the Diameter network device 102 may provide information to the remote Diameter network device 102' of the tokens that were allocated (stage 306). Based on the information received in the notification, the remote Diameter network device 102' may send a corresponding number of requests to the network device 102 based on the number of tokens that device 102 had allocated (stage 308). The Diameter network device 102 then receives and processes those requests from remote Diameter network device 102', wherein each received request has a corresponding allocated token (stage 310).

Figure 4:
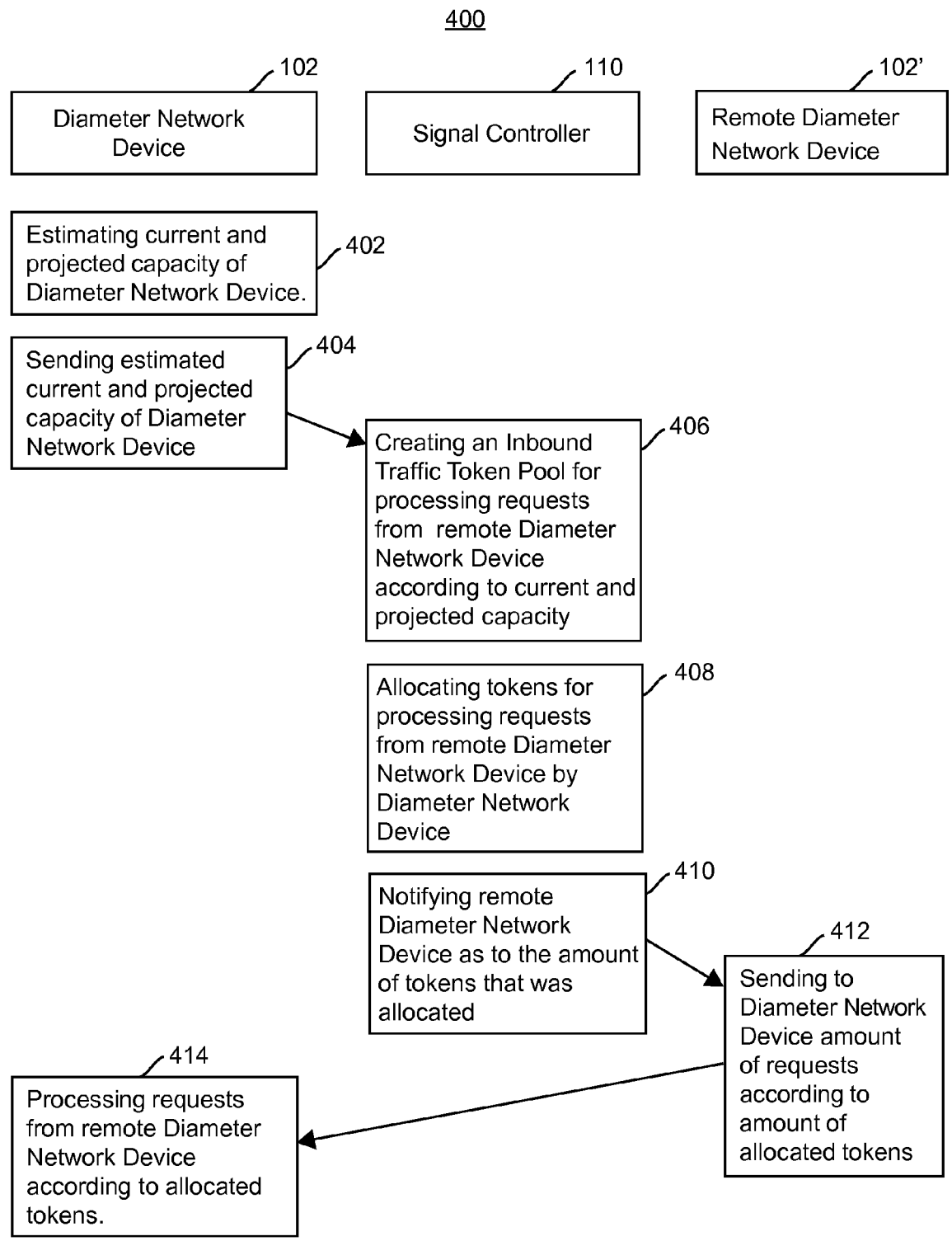
FIG. 4 illustrates a flowchart of using a signaling controller with a Diameter Routing Agent (DRA) to manage allocation of tokens between Diameter network devices in accordance with an aspect of the present disclosure.

FIG. 4 illustrates a flowchart of using a signaling controller with a Diameter Routing Agent (DRA) to manage allocation of tokens between Diameter network devices in accordance with an aspect of the present disclosure. As shown in FIG. 4, the Diameter network device 102 may estimate current and projected capacity of requests that it may process (stage 402). The Diameter network device 102 may then send its estimated current and projected capacity to the signal controller 110 (stage 404).

Upon receiving network device's 102 estimated current and projected capacity information, the signal controller 110 may operate its own an Inbound Traffic Token Pool for allocating tokens and processing requests from other remote Diameter network device(s) based on the capacity information of Diameter network device 102 (stage 406).

As shown in FIG. 4, the signal controller 110 may allocate one or more tokens associated with processing requests from a remote Diameter network device 102' on behalf of Diameter network device 102 (stage 408). Once the signal controller 110 has allocated the one or more tokens, the signal controller 110 notifies the remote Diameter network device 102' regarding the number of tokens that the signal controller 110 has allocated (stage 410).

Upon receiving the notification, the Diameter network device 102' may send to one or more requests to the Diameter network device 102, in which the number of requests sent corresponds to the number of tokens allocated by the signal controller 110 (stage 412). The Diameter network device 102 then receives and processes the received requests from Diameter network device 102' in which each received request has a corresponding allocated token (stage 414).

Figure 5A:
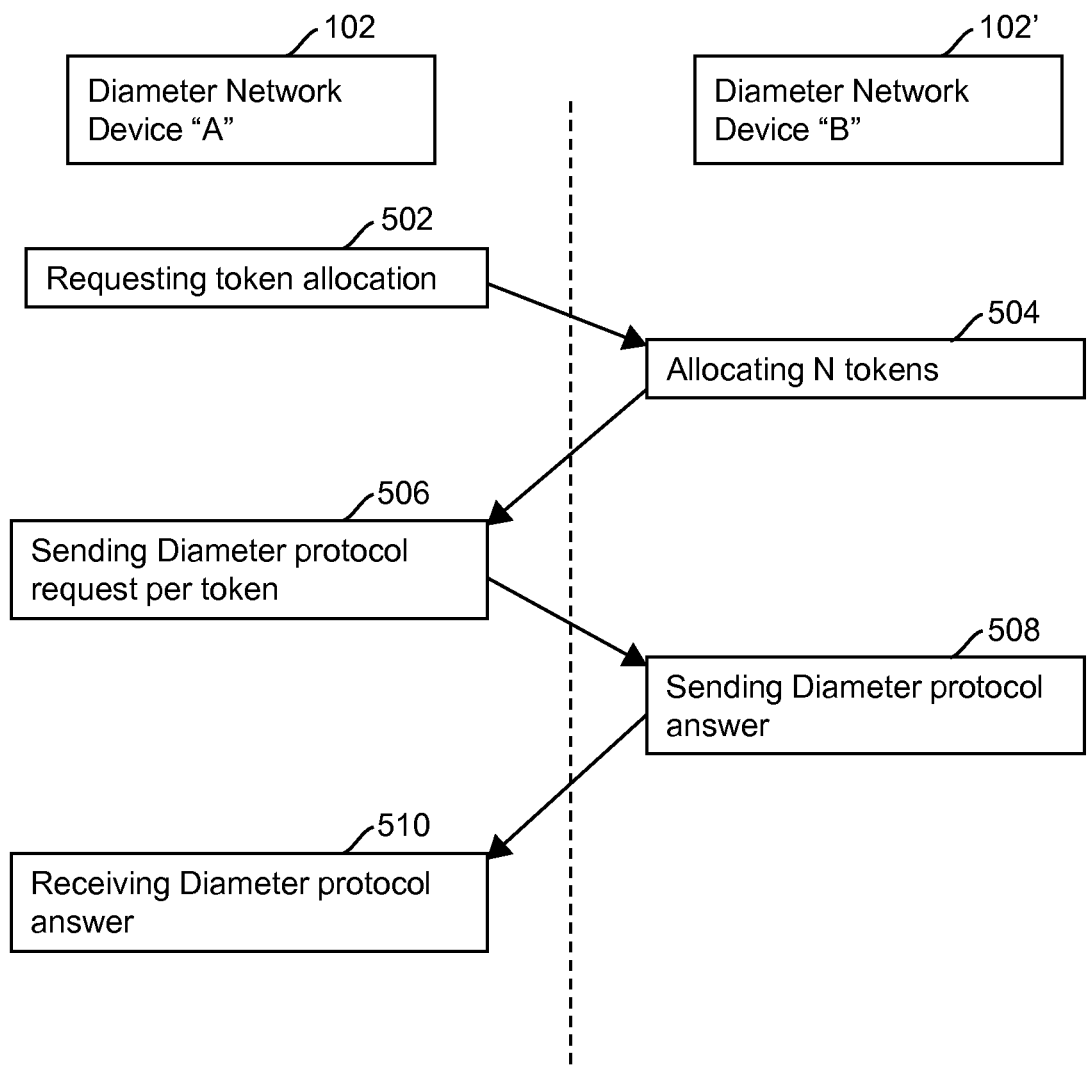
FIG. 5A illustrates a flowchart representing interactions between two Diameter network devices supporting token-based throttling in accordance with an aspect of the present disclosure.

FIG. 5A illustrates a flowchart representing interactions between two Diameter network devices supporting token-based throttling in accordance with an aspect of the present disclosure. With respect to FIG. 5A, Diameter network device "A" 102 may send a token allocation request to Diameter network device "B" 102' (stage 502). In response, Diameter network device "B" 102' may allocate N tokens and sends the N tokens to Diameter network device "A" 102 (stage 504). It should be noted that N tokens can be one or more tokens, although N tokens may appear herein as being plural in nature.

Diameter network device "A" 102 may send 'N' number of Diameter-based requests to Diameter network device "B" 102' based on the number of N allotted tokens (stage 506). Next, Diameter network device "B" 102' may send a Diameter protocol response to Diameter network device "A" 102 for each received request (stage 508). The Diameter network device "A" 102 thereafter receives the Diameter protocol response (stage 510).

Figure 5B:
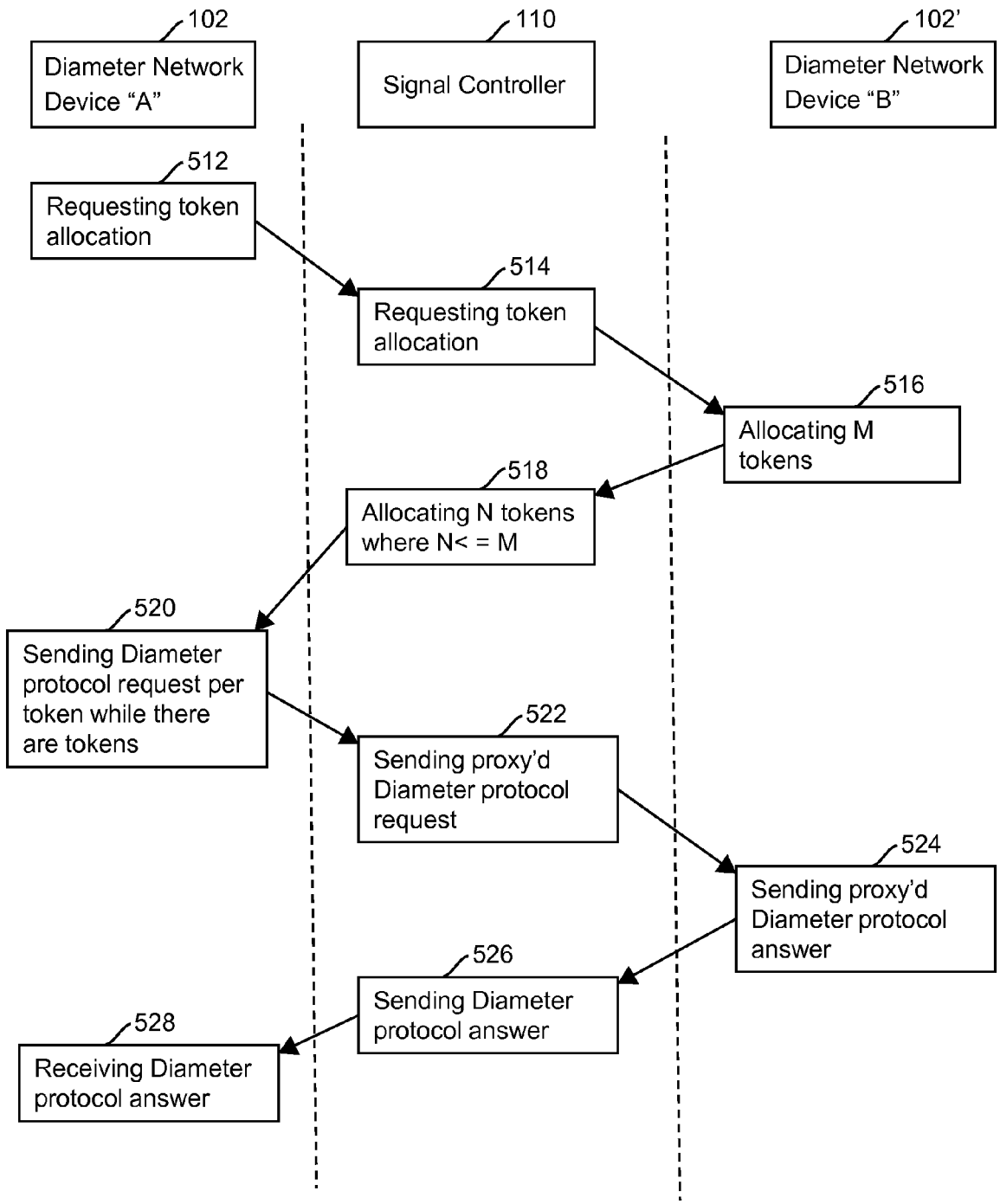
FIG. 5B, illustrates a flowchart representing interactions between a plurality of Diameter-enabled network devices supporting token-based throttling process in accordance to an aspect of the present disclosure.

FIG. 5B, illustrates a flowchart representing interactions between a plurality of Diameter-enabled network devices supporting token-based throttling process in accordance to an aspect of the present disclosure. As shown in FIG. 5B, Diameter network device "A" 102 may send a token allocation request for M tokens to Diameter network device "B" 102' via the signal controller 110 which is executing the DRA 210 (stage 512). It should be noted that M tokens can be one or more requested tokens to be allocated.

The signal controller 110, upon receiving the token allocation request from network device "A" 102, forwards the request to Diameter network device "B" 102' (stage 514). Diameter network device "B" 102' then allocates M number of tokens based on the request and sends a message regarding the same to the signal controller 110 (stage 516).

Upon receiving a message from Diameter network device "B" 102', the signal controller 110 allocates N number tokens and send information of the allocated N number of tokens to Diameter network device "A" 102, whereby the value of N may be equal to or smaller than the value of M (stage 518).

In an aspect, as shown in FIG. 5B, while there are still tokens that are available, Diameter network device "A" 102 may send a Diameter protocol request, per token, to Diameter network device "B" 102' via the signal controller 110 (stage 520).

The signal controller 110 may then send a proxy'd diameter protocol request to Diameter network device "B" 102' (stage 522). In an aspect, the signal controller 110 may modify the request from the device "A" 102 before sending the proxy'd request to device "B" 102'. As a response, Diameter network device "B" 102' may send an answer to the proxy'd Diameter protocol request (stage 524). Next, the signal controller 110 may send a Diameter protocol answer to Diameter network device "A" 102 (stage 526). The Diameter protocol answer is then received at Diameter network device "A" 102 (stage 528).

Figure 5C:
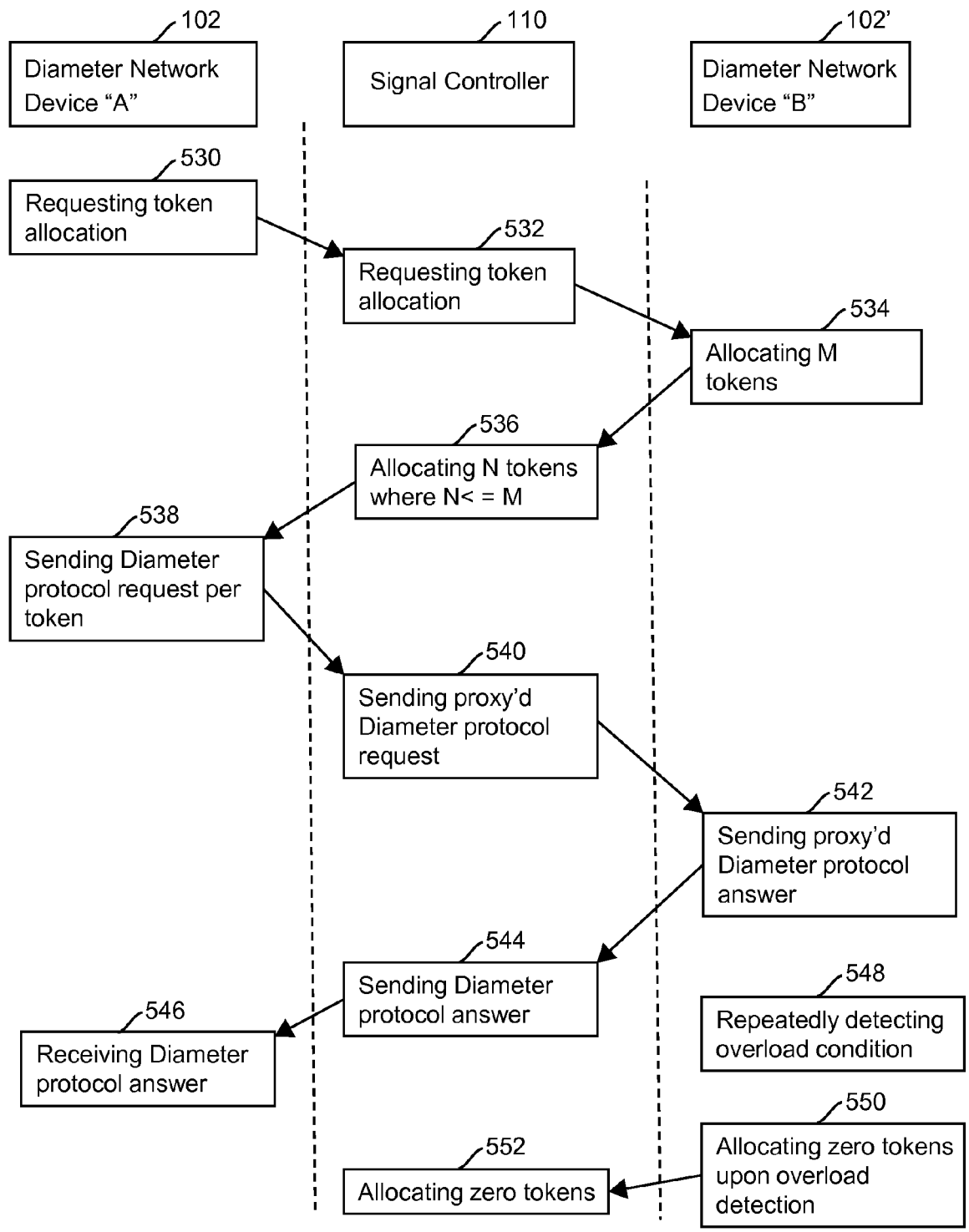
FIG. 5C illustrates a flowchart representing the managing an internal overload condition (error) in accordance with an aspect of the present disclosure.

FIG. 5C illustrates a flowchart representing the managing an internal overload condition (error) in accordance with an aspect of the present disclosure. As will be explained in more detail below, one or more network devices 102, 102' and/or signal controller 110 may detect an internal overload condition (error) and may accordingly take back all the tokens it previously allocated.

With respect to FIG. 5C, Diameter network device "A" 102 may send a token allocation request to Diameter network device "B" 102' via the signal controller 110 (stage 530). In response, the signal controller 110 may forward the allocation request to Diameter network device "B" 102' (stage 532). Next, Diameter network device "B" 102' may allocate M number tokens and generate a message including information regarding the allocation to the signal controller 110 (stage 534). Upon receiving the notification from Diameter network device "B" 102', the signal controller 110 may allocate N number of tokens and send a corresponding notification to Diameter network device "A" 102 (stage 536). It should be noted that the value of N may be equal to or smaller than the value of M.

In the event that one or more tokens are available (and no new tokens have been allocated), Diameter network device "A" 102 may send a Diameter protocol request, per token, to Diameter network device "B" 102' via the signal controller 110 (stage 538). Upon receiving the request, the signal controller 110 may generate and send a proxy'd Diameter protocol request to Diameter network device "B" 102' (stage 540). As a response, Diameter network device "B" 102' may send an answer to the proxy'd Diameter protocol request (stage 542). Next, the signal controller 110 receives the answer from network device "B" 102' and sends the Diameter protocol answer to Diameter network device "A" 102 (stage 544).

In the example shown in FIG. 5C, Diameter network device "B" 102' may detect an overload condition, which signifies that Diameter network device "B" 102' has reached its capacity and may not take additional requests from another Diameter network device (stage 548). In response, Diameter network device "B" 102' may send a zero '0' token allocation message to the signal controller 110 (stage 550). Upon receiving the zero token allocation message from network device "B" 102', the signal controller 110 stores the notification and does not send a response to network device "A" 102 (stage 552).

Figure 5D:
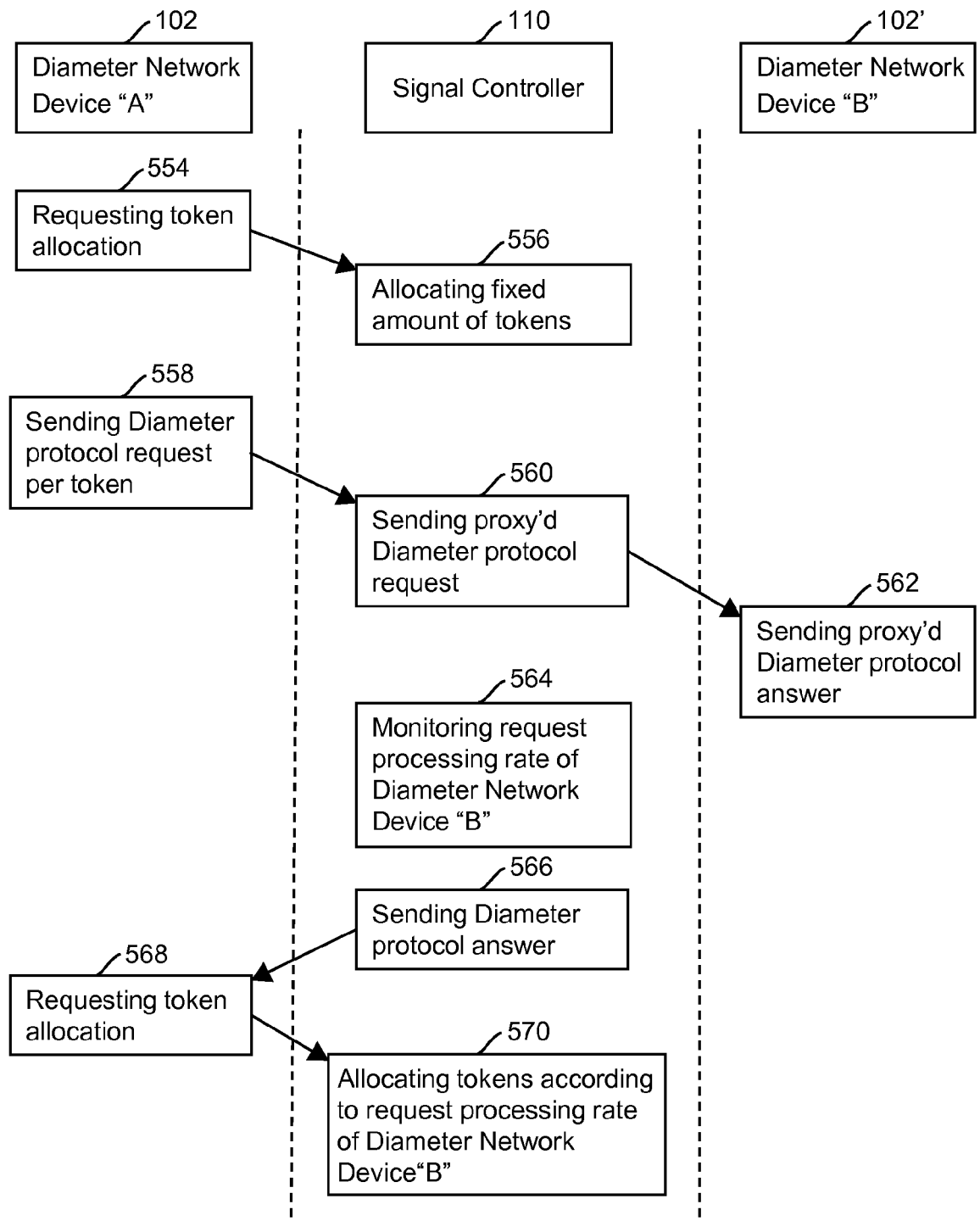
FIG. 5D illustrates a flowchart representative of the throttling process by estimating performance of a remote Diameter network device in accordance with an aspect of the present disclosure.

FIG. 5D illustrates a flowchart representative of the throttling process by estimating performance of a remote Diameter network device in accordance with an aspect of the present disclosure. In an aspect, the signal controller 110 may estimate the performance of one or more Diameter network devices and may correspondingly throttle requests to and/or from the one or more Diameter network devices, thereby relinquishing the throttling process from the one or more Diameter network devices. According to some aspects of the present disclosure, multiple token pools may be implemented in the signal controller 110 (e.g.: signal controller may maintain a token pool for network devices A and B, B', etc).

As shown in FIG. 5D, Diameter network device "A" 102 may send a token allocation request to the signal controller 110 (stage 554). In response, the signal controller 110 may allocate a set number of tokens for network device "A" 102 (stage 556). In an aspect, the signal controller 110 may send a message back to network device "A" 102 confirming that tokens have been allocated as well as providing any other appropriate information to network device "A" 102. Diameter network device "A" 102 may thereafter send a Diameter protocol request, per token, to Diameter network device "B" 102' via the signal controller 110 (stage 558). As a result, the signal controller 110 may send a proxy'd Diameter protocol request to Diameter network device "B" 102' (stage 560). Next, Diameter network device "B" 102' may send an answer to the proxy'd Diameter protocol request back to the signal controller 110 (stage 562). Over time, the signal controller 110 may monitor and record Diameter network device's 102' request processing rate (stage 564). Next, the signal controller 110 may send a Diameter protocol answer to Diameter network device "A" 102 (stage 566). Thereafter, Diameter network device "A" 102 may send a token allocation request to the signal controller 110 (stage 568). In response, the signal controller 110 may allocate one or more tokens based on the monitored request processing rate of Diameter network device "B" 102' (stage 570).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of load balancing of requests between Diameter-enabled network devices, the method comprising:
    processing, at a signal controller in communication with a first Diameter-enabled network device and a second Diameter-enabled network device, request handling capacity of at least the second Diameter-enabled network device;
    allocating, at the signal controller, one or more tokens for inbound requests from the first Diameter-enabled network device to the second Diameter-enabled network device;
    notifying the second Diameter-enabled network device of the one or more allocated tokens for handling a corresponding number of requests from the first Diameter-enabled network device;
    coordinating, at the signal controller, transmission of the corresponding number of requests from the first Diameter-enabled network device to the second Diameter-enabled network device via the signal controller;
    detecting, at the second Diameter-enabled network device, an overload condition in the second Diameter-enabled network device; and
    notifying the signal controller to allocate zero tokens to the second Diameter-enabled network device, wherein the signal controller does not send any further requests to the second Diameter-enabled network device.

2. A non-transitory computer readable medium having stored thereon instructions for load balancing of requests between Diameter-enabled network devices, comprising machine executable code which when executed by at least one processor in a signal controller in communication with a first Diameter-enabled network device and a second Diameter-enabled network device, causes the processor to:
    determine request handling capacity of at least the second Diameter-enabled network device;
    allocate one or more tokens for inbound requests from the first Diameter-enabled network device to the second Diameter-enabled network device;
    notify the second Diameter-enabled network device of the one or more allocated tokens for handling a corresponding number of requests from the first Diameter-enabled network device;
    coordinate transmission of the corresponding number of requests from the first Diameter-enabled network device to the second Diameter-enabled network device;
    receive a notification from the second Diameter-enabled network device that has detected an overload condition, the notification indicating to allocate zero tokens to the first Diameter-enabled network device; and
    not sending any further requests from the first Diameter-enabled network device to the second Diameter-enabled network device.

3. A signal controller in communication with a first Diameter-enabled network device and a second Diameter-enabled network device, the signal controller comprising:
    a network interface configured to be capable of receiving and transmitting network data packets over one or more networks;
    a memory configured to store executable programming instructions; and
    a processor configured executing the stored programming instructions, which when executed result in actions being performed that include:
        processing request handling capacity of at least the second Diameter-enabled network device;
        allocating one or more tokens for inbound requests from the first Diameter-enabled network device to the second Diameter-enabled network device;
        notifying the second Diameter-enabled network device of the one or more allocated tokens for handling a corresponding number of requests from the first Diameter-enabled network device; and
        coordinating transmission of the corresponding number of requests from the first Diameter-enabled network device to the second Diameter-enabled network device, wherein the signal controller receives a notification from the second Diameter-enabled network device that has detected an overload condition, the notification indicating to allocate zero tokens to the first Diameter-enabled network device; and does not send any further requests from the first Diameter-enabled network device to the second Diameter-enabled network device.

4. A system comprising:
    a first Diameter-enabled network device connected to a network;
    a second Diameter-enabled network device connected to the network;
    a signal controller in communication with the first Diameter-enabled network device and the second Diameter-enabled network device via the network, the signal controller comprising:
        a network interface configured to be capable of receiving and transmitting network data packets over one or more networks;
        a memory configured to store executable programming instructions; and
        a processor configured to execute the stored programming instructions, which causes the processor to:

process request handling capacity of at least the second Diameter-enabled network device;

allocate one or more tokens for inbound requests from the first Diameter-enabled network device to the second Diameter-enabled network device;

notify the second Diameter-enabled network device of the one or more allocated tokens for handling a corresponding number of requests from the first Diameter-enabled network device; and coordinate transmission of the corresponding number of requests from the first Diameter-enabled network device to the second Diameter-enabled network device via the signal controller, wherein the signal controller receives a notification from the second Diameter-enabled network device that has detected an overload condition, the notification indicating to allocate zero tokens to the first Diameter-enabled network device; and does not send any further requests from the first Diameter-enabled network device to the second Diameter-enabled network device.

5. A method of load balancing of requests between Diameter-enabled network devices, the method comprising:

processing, by a signal controller device in communication between at least a first Diameter-enabled network device and a second Diameter-enabled network device, a request for a handling capacity of at least the second Diameter-enabled network device, wherein the processing comprises detecting when there is an overload condition in the second Diameter-enabled network device;

allocating, by the signal controller device, one or more tokens for inbound requests from the first Diameter-enabled network device to the second Diameter-enabled network device;

notifying, by the signal controller device, the second Diameter-enabled network device when at least one of the one or more tokens are allocated for handling a corresponding number of requests from the first Diameter-enabled network device; and coordinating, by the signal controller device, transmission of the corresponding number of requests from the first Diameter-enabled network device to the second Diameter-enabled network device, wherein no further requests are sent to the second Diameter-enabled network device when an overload condition is detected.

6. The method according to claim 5, wherein the signal controller device is configured to prioritize token allocation between the first and second Diameter-enabled network device.

7. The method according to claim 5, wherein the request handling capacity further comprises current and projected capacity of the second Diameter-enabled network device.

8. The method according to claim 5, further comprising the signal controller device allocating the one or more tokens at a refill rate based on current and projected capacity of the second Diameter-enabled network device.

9. The method according to claim 5, wherein the allocated tokens are available for a predetermined period of time.

10. A non-transitory computer readable medium having stored thereon instructions for load balancing of requests between Diameter-enabled network devices, comprising machine executable code which when executed by at least one processor, causes the processor to perform steps comprising:

processing communication between at least a first Diameter-enabled network device and a second Diameter-enabled network device;

determining a request handling capacity of at least the second Diameter-enabled network device, wherein the determining comprises detecting when there is an overload condition in the second Diameter-enabled network device;

allocating one or more tokens for inbound requests from the first Diameter-enabled network device to the second Diameter-enabled network device, when no overload condition is detected in the second Diameter-enabled network device;

notifying the second Diameter-enabled network device when at least one of the one or more tokens are allocated for handling a corresponding number of requests from the first Diameter-enabled network device; and coordinating transmission of the corresponding number of requests from the first Diameter-enabled network device to the second Diameter-enabled network device, wherein no further requests are sent to the second Diameter-enabled network device when an overload condition is detected.

11. The computer readable medium according to claim 10, wherein the processor is configured to prioritize token allocation between the first and second Diameter-enabled network device.

12. The computer readable medium according to claim 10, wherein the request handling capacity further comprises current and projected capacity of the second Diameter-enabled network device.

13. The computer readable medium according to claim 10, wherein the processor is further configured to allocate the one or more tokens at a refill rate based on current and projected capacity of the second Diameter-enabled network device.

14. The computer readable medium according to claim 10, wherein the allocated tokens are available for a predetermined period of time.

15. A signal controller device comprising:

a memory storing programmed instructions; and a processor coupled to the memory and configured to execute the stored programmed instructions to perform steps comprising:

processing communication between at least a first Diameter-enabled network device and a second Diameter-enabled network device;

determining a request handling capacity of at least the second Diameter-enabled network device, wherein the determining comprises detecting when there is an overload condition in the second Diameter-enabled network device;

allocating one or more tokens for inbound requests from the first Diameter-enabled network device to the second Diameter-enabled network device, when no overload condition is detected in the second Diameter-enabled network device;

notifying the second Diameter-enabled network device when at least one of the one or more tokens are allocated for handling a corresponding number of requests from the first Diameter-enabled network device; and coordinating transmission of the corresponding number of requests from the first Diameter-enabled network device to the second Diameter-enabled network device, wherein no further requests are sent to the second Diameter-enabled network device when an overload condition is detected.

16. The signal controller device according to claim 15, wherein the signal controller device is configured to prioritize token allocation between the first and second Diameter-enabled network device.

17. The signal controller device according to claim 15, wherein the request handling capacity further comprises current and projected capacity of the second Diameter-enabled network device.

18. The signal controller device according to claim 15, wherein the signal controller device allocates the one or more tokens at a refill rate based on current and projected capacity of the second Diameter-enabled network device.

19. The signal controller device according to claim 15, wherein the allocated tokens are available for a predetermined period of time.

20. A system comprising:
a first Diameter-enabled network device connected to a network;
a second Diameter-enabled network device connected to the network;
a signal controller device comprising:
a memory storing programmed instructions; and
a processor coupled to the memory and configured to execute the stored programmed instructions, which cause the processor to:
process communication between at least a first Diameter-enabled network device and a second Diameter-enabled network device;
determine a request handling capacity of at least the second Diameter-enabled network device, wherein the determining comprises detecting when there is an overload condition in the second Diameter-enabled network device;
allocate one or more tokens for inbound requests from the first Diameter-enabled network device to the second Diameter-enabled network device, when no overload condition is detected in the second Diameter-enabled network device;
notify the second Diameter-enabled network device when at least one of the one or more tokens are allocated for handling a corresponding number of requests from the first Diameter-enabled network device; and
coordinate transmission of the corresponding number of requests from the first Diameter-enabled network device to the second Diameter-enabled network device via the signal controller device, wherein no further requests are sent to the second Diameter-enabled network device when an overload condition is detected.

21. The system according to claim 20, wherein the signal controller device is configured to prioritize token allocation between the first and second Diameter-enabled network device.

22. The system according to claim 20, wherein the request handling capacity further comprises current and projected capacity of the second Diameter-enabled network device.

23. The system according to claim 20, wherein the signal controller device allocates the one or more tokens at a refill rate based on current and projected capacity of the second Diameter-enabled network device.

24. The system according to claim 20, wherein the allocated tokens are available for a predetermined period of time.

* * * * *